United States Patent [19]

Knop et al.

[11] 4,251,137

[45] Feb. 17, 1981

[54] TUNABLE DIFFRACTIVE SUBTRACTIVE FILTER

[75] Inventors: Karl Knop, Zurich; James Kane, Zumikon, both of Switzerland

[73] Assignee: RCA Corporation, New York, N.Y.

[21] Appl. No.: 942,184

[22] Filed: Sep. 14, 1978

[30] Foreign Application Priority Data

Sep. 28, 1977 [GB] United Kingdom ............... 40422/77

[51] Int. Cl.³ .............................................. G02F 1/133
[52] U.S. Cl. ................... 350/347 V; 350/341; 350/162 R
[58] Field of Search .............. 350/162 R, 162 SF, 314, 350/341, 347, 348, 347 V

[56] References Cited

U.S. PATENT DOCUMENTS

| | | |
|---|---|---|
| 3,787,110 | 1/1974 | Berreman et al. .................... 350/341 |
| 3,957,354 | 5/1976 | Knop ..................................... 350/162 SF |
| 4,037,929 | 7/1977 | Bricot et al. ........................... 350/347 |
| 4,130,347 | 12/1978 | Knop ..................................... 350/162 R |

OTHER PUBLICATIONS

Flanders et al.: "Alignment of Liquid Crystals Using Submicrometer Periodicity Gratings," *Applied Physics Letters*, vol. 32, May 15, 1978, pp. 597–598.

*Primary Examiner*—Edward S. Bauer
*Attorney, Agent, or Firm*—Samuel Cohen; George J. Seligsohn

[57] ABSTRACT

A diffractive subtractive filter is made tunable by controllably varying the index of refraction of a fluid medium in contact with a surface relief pattern of a solid diffractive phase medium. A liquid crystal is the preferred fluid.

2 Claims, 7 Drawing Figures

TUNABLE DIFFRACTIVE SUBTRACTIVE FILTER

This invention relates to diffractive-subtractive color filters and, more particularly, to tunable diffractive-substractive color filters.

U.S. Pat. No. 3,957,354, issued May 18, 1976 to Karl Knop (one of the present applicants) discloses diffractive-substrative color filtering techniques. These techniques make it possible to derive zero-diffraction order light of a specified color hue in response to the illumination of white light by a diffractive phase medium that includes a fixed, predetermined-waveform profile surface relief pattern. Preferably, the predetermined-waveform is a rectangular waveform of a specified amplitude. The color hue of the zero-order diffraction output light depends upon the value of the specified amplitude of the rectangular waveform. While the diffractive phase medium may be a reflecting medium, which returns incident light to its surroundings, the diffracting phase medium is preferably a transmissive medium exhibiting an index of refraction different from that of its surroundings.

In accordance with the principles of the present invention, a tunable diffractive-substractive color light filter comprises a solid diffractive phase medium (which can be either reflective or transmissive) including a fixed, predetermined-waveform profile surface relief pattern. This surface relief pattern is immersed in an adjustable index-of-refraction, optically-transparent fluid medium. The tunable diffractive-substractive color filter further includes control means for selectively controlling the index of refraction of the fluid medium.

In the Drawing:

FIG. 1 schematically illustrates a typical prior-art rectangular-waveform transmissive diffractive subtractive color filter;

Figure 1:
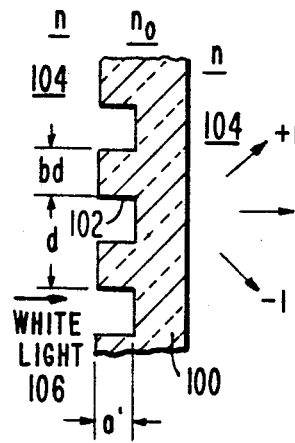

Referring to FIG. 1, there is shown a transparent medium 100 (such as polyvinyl chloride) having a rectangular-waveform diffraction grating 102 embossed as a relief-pattern on a surface thereof. Medium 100, exhibiting an index of refraction $n_0$, is surrounded by another medium 104, exhibiting an index of refraction n which is different from $n_0$. The physical amplitude (depth) of rectangular grating 102 is a'; the line spacing of the rectangular grating 102 is d, and the aspect ratio of rectangular grating 102 is b. In FIG. 1, the aspect ratio b is shown as 50 percent; i.e., rectangular grating 102 is a symmetric square-wave grating. However, the aspect ratio b (which affects saturation of the color) may have any desired value between 0-100 percent.

Medium 100 is illuminated by a beam of white light 106, which includes wavelengths extending over the visible spectrum. As shown in FIG. 1, rectangular grating 102 diffracts the light passing through medium 100 into the zero diffraction order and higher diffraction orders, such as the +1 and the −1 diffraction orders. The color of the zero order output light (which is the desired output light) is not white, but depends on the zero order transfer function of rectangular grating 102, as more fully described in the aforesaid U.S. Pat. No. 3,957,354.

Figure 2:
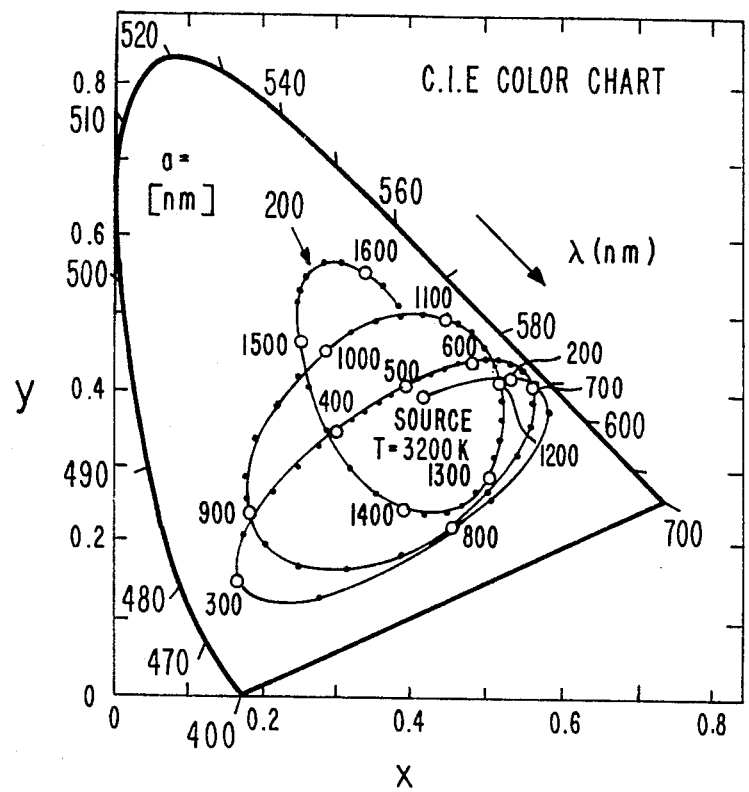
FIG. 2 illustrates a CIE color chart of such a diffractive subtractive color filter.

FIG. 2 is a CIE color chart showing the zero-order-transfer function of a diffractive subtractive color filter with b=0.5 in accordance with the value of the optical amplitude a of a rectangular-wave grating illuminated with white light having a source temperature of 3200 K. The optical amplitude a is equal to the physical amplitude a' of grating 102 multiplied by the absolute value of the difference between the respective indices of refraction $n_0$ of medium 100 and n of surroundings 104. Thus, the functional relationship between the zero-order-filter transfer function of the diffractive subtractive color filter shown in FIG. 2 is independent of the grating parameter d (shown in FIG. 1). The reasons for this is that the functional relationship shown in FIG. 2 is determined in accordance with simple diffraction theory (i.e. the Kirchhoff-Huygens approximation). Because simple diffraction theory does not take into account the fact that light is actually an electro-magnetic wave (defined by the Maxwell equation), simple diffraction theory is valid only when the line spacing of the grating is substantially larger than any wave-length included within the spectrum of white light traveling through the grating. That is, any error introduced by the Kirchhoff-Huygens approximation becomes negligible for all visible wavelengths so long as the producet nd is equal to or greater than 5 μm. For substantially finer line gratings, (2 μm or less) it is necessary to employ rigorous diffraction theory, which take in to account that light is an electromagnetic wave defined by the Maxwell-equations.

Reference is made to the copending U.S. Pat. application Ser. No. 841,057, filed Oct. 11, 1977 (which issued as U.S. Pat. No. 4,130,347 on Dec. 19, 1978) by Knop and assigned to the same assignee as the present invention, which discusses in detail such fine-line diffractive substrative color filters. For the purposes of the present invention, it is sufficient to state that the color hue of the zero diffraction order of the fine line diffractive-subtractive color filter is a function of the aspect ratio b and the line spacing d, as well as the optical amplitude a. Using rigorous diffraction theory, solutions can be derived only numerically with the help of a computer because the result depends on all the grating parameters in a very complicated fashion. Regardless of this fact, any given diffractive subtractive color filter (whether fine-line or coarse-line) having a fixed physical amplitude a', a fixed line spacing d and a fixed aspect ratio b, exhibits a zero-order-filter transfer function which may be tuned by varying the absolute value of the difference between the respective indices of refraction $n_0$ of medium 100 and n of surroundings 104.

Figure 3A:
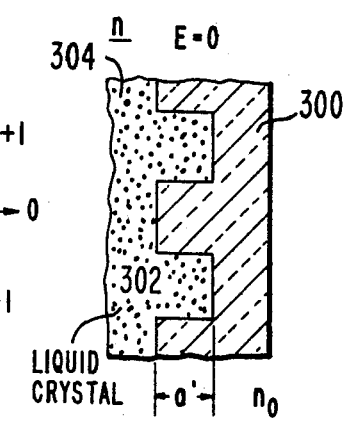
FIGS. 3a and 3b illustrate a first example of tunable diffractive subtractive color filter.

Referring now to FIG. 3a, there is shown a solid diffracting phase medium 300, similar to medium 100, which includes a rectangular waveform surface relief pattern 302. Surface relief pattern 302 is immersed in a "twisted-nematic" type liquid crystal material 304. In FIG. 3a, no electric field is applied (i.e., the intensity of the electric field E is zero). In this case, the liquid-crystal molecules naturally orient themselves with their long axis parallel to the grating lines (i.e., perpendicular to the plane of the paper, as indicated by the dots in FIG. 3a). This makes the liquid crystal within the grating lines optically very anisotropic. In particular, the refractive index of the liquid crystal of FIG. 3a for illuminating white light that is polarized parallel to the grating line grooves was found to be in the range of 1.70–1.80. However, when illuminated with light polarized perpendicular to the grating line grooves of FIG. 3a the liquid crystal exhibited a refractive index in the range of 1.45–1.55. Since both the physical amplitude a' and the index of refraction $n_0$ of medium 300 of FIG. 3a are fixed, the optical amplitude a, and hence the color hue of the zero order diffraction light, is materially different for illuminating light polarized parallel to the grating line grooves than it is for illuminating light polarized perpendicular to the grating line grooves.

Figure 3B:
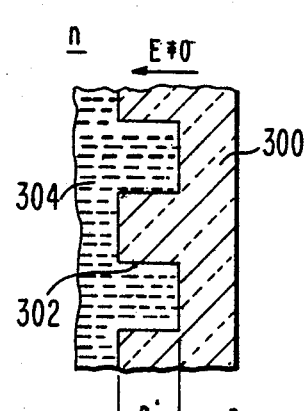

The arrangement shown in FIG. 3b is identical to that shown in FIG. 3a except for the application of an appreciable electric field E directed perpendicular to the grating line grooves, as indicated by the arrow in FIG. 3b. The result is that the molecules of liquid crystal 304 now orient themselves with their long axis parallel to the electric field (i.e., perpendicular to the grating line grooves as indicated in FIG. 3b by the short lines in plane of the paper). Under these conditions, the diffractive subtractive color filter shown in FIG. 3b operates isotropically, exhibiting substantially the same index of refraction for both polarizations of light. Furthermore, the isotropic refraction index with the electric field applied turns out to be approximately equal to the perpendicular polarization index (1.45–1.55) when no electric field is applied.

Thus, due to the anisotropy when no electric field is applied, the application of an electric field results in a large change optical amplitude for illuminating light polarized parallel to the grating line grooves, but results in very little change in the optical amplitude for illuminating light polarized perpendicular to the grating line grooves. Since illuminating white light is normally non-polarized light, this anisotropy presents a problem. The simplest solution to this problem of anisotropy of a liquid crystal grating cell is to add a sheet of polarizer to the device which produces light polarized parallel to the grating line grooves. This, however, results in the loss of at least half of the light, which is undesirable. A second solution to the problem of anisotropy is choose the respective values of $n_0$ of medium 300 and the physical depth a' of grating 302 such that an optical amplitude a corresponding to a dark color results. For instance, as indicated in the CIE color chart of FIG. 2, an optical amplitude for a of 280 nanometers (nm) corresponds to a dark blue. Now, if the index of refraction $n_0$ of medium 300 is selected to be substantially equal to n of liquid crystal 304 for parallel-polarized of illuminating light in FIG. 3a, while the physical amplitude a' is selected so that the product of the absolute value of the difference in index of refraction n for perpendicular polarized illuminating light of FIG. 3a and $n_0$ multiplied by the physical amplitude a' equals 280 nm, dark blue zero diffraction order output light is produced with the electric field on and half-intensity white zero diffraction order light, polarized parallel to the grating line grooves, is produced with the electric field off.

Figure 4:
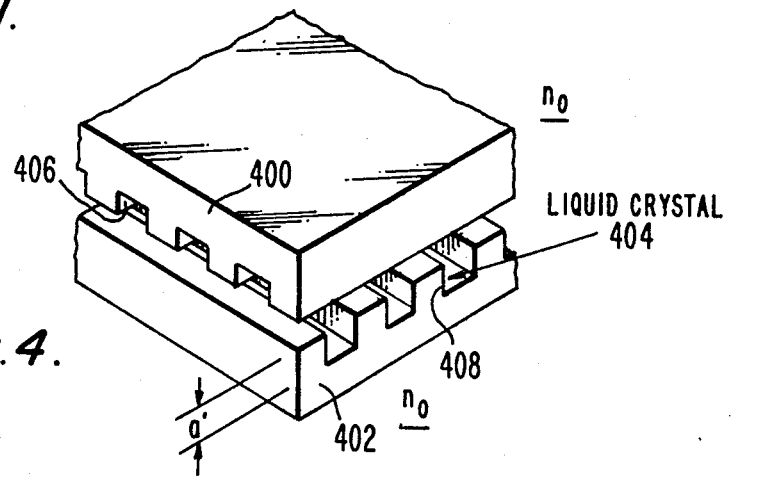
FIG. 4 illustrates a second example of a tunable diffractive subtractive color filter.

The best solution presently known to the applicants to the problem of anisotropy of liquid crystals is shown in FIG. 4. The arrangement of FIG. 4 comprises a sandwich of spaced first and second grating structures 400 and 402 with liquid crystal material 404 filling the space therebetween. First grating structure structure 400 incorporates first rectangular waveform surface relief pattern 406 in contact with liquid crystal 404 and second grating structure 402 incorporates second rectangular waveform surface relief pattern 408 in contact with liquid crystal 404. As shown, the respective grating line grooves of relief patterns 406 and 408 are oriented substantially perpendicularly to each other. In FIG. 4, the index of refraction $n_0$ of structures 400 and 402 may be selected to be substantially equal to the index of refraction n of liquid crystal 404 with an applied electric field (i.e., about the same as the index of refraction n for perpendicular polarized light). At the same time, the physical amplitude a' of gratings 406 and 408 may be selected to be substantially equal to the quotient of 280 nm divided by the absolute value of the difference between the index of refraction n for parallel polarized light and $n_0$. In this case, a dark blue display is produced with the field off and a full-intensity white display is produced with the field on. This provides maximum contrast.

The aforesaid U.S. Pat. No. 3,957,354 teaches that the zero diffraction order transmittance of a single rectangular waveform grating structure is a cosine-squared ($\cos^2$) function of wavelength, so that the transmittance of the two-grating structure shown in FIG. 4 is a product of two $\cos^2$ functions of wavelength.

Specifically, $$T_{off} = \cos^2\left[\pi \frac{a'}{\lambda}(n_\parallel - n_0)\right] \cos^2\left[\pi \frac{a'}{\lambda}(n_\perp - n_0)\right] \quad (1)$$

$$T_{on} = \cos^4\left[\pi \frac{a'(n_{on} - n_0)}{\lambda}\right] \quad (2)$$

where, $T_{off}$ and $T_{on}$ are the respective transmittances with the electric field off and on; $n_\parallel$ and $n_\perp$ are the respective values of n for light polarized parallel to the grating with the electric field off, and light polarized perpendicular to the grating with the electric field off; $n_{on}$ is the value n with the electric field on for either light polarization, and $\lambda$ is the wavelength. As said before, $n_\perp$ is closed to the value of $n_{on}$. It can be seen from equations 1 and 2 that various tunable color filters can be designed using the arrangement of FIG. 4 by choosing the respective values for index of refraction $n_0$ and the physical amplitude a' to provide any desired a. These choices include, but are not limited to, the choice which provides maximum contrast, discussed above.

Figure 5A:
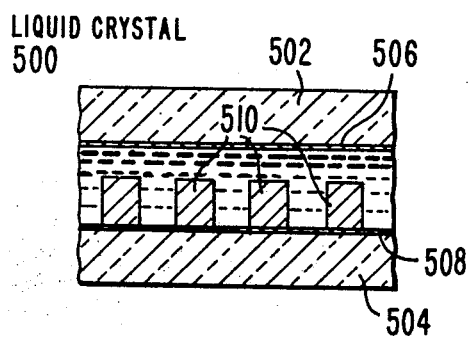
FIGS. 5a and 5b illustrate first and second practical embodiments of a tunable diffractive subtractive color filter.
Figure 5B:
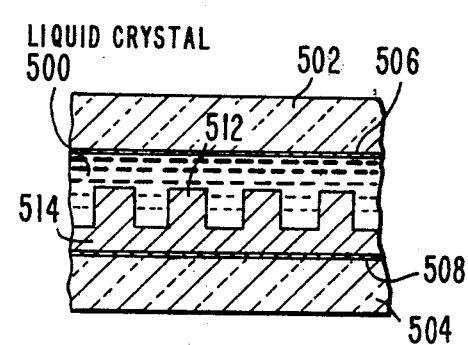

Examples of practical liquid crystal cells are shown in FIGS. 5a and 5b. Specifically, the cells of both FIGS. 5a and 5b comprises liquid crystal 500 filling a space of about 5–10 $\mu$m separating upper glass plate 502 and lower glass plate 504. An electric field is applied across liquid crystal 500 by means of transparent tin-oxide upper electrode 506, coating the inner surface of upper glass plate 502, and transparent tin-oxide lower electrode 508 coating the inner surface of lower glass plate 504. The cell of FIG. 5a has deposited, on lower electrode 508, grating 510, composed of a material such as zinc sulfide (having a value of $n_0$ of about 2.36) or titanium oxide (having a value of $n_0$ of about 2.6). The cell of FIG. 5b contains a grating structure 512 which is embossed in a thermoplastic material 514. An example of thermoplastic material is FEP (a Teflon-like thermoplastic material manufactured and sold by Dupont) which has a value $n_0$ of about 1.37. Grating lines spacings of about 5 $\mu$m provide good results that agree with the CIE color chart shown in FIG. 2. Finer line spacing grating may be employed, such as 1.4 $\mu$m, but, in this case, an aspect ratio b other than 50 percent is generally used to obtain saturated colors because of the invalidity of the simplified diffraction theory, discussed above, for these finer line spacing gratings.

The cells of FIGS. 5a and 5b can be built to display graphical information (e.g., 7-segment digits) by restricting one or both electrodes to certain areas. (This technique is well-known from standard liquid crystal displays). In addition, gratings can be restricted to given areas, so that areas without grating display white and show no color change. Also, gratings of different depths can be used with one single cell to provide a multi-colored display.

Liquid crystals are usually used in a binary fashion with the electric field either on or off. However, it is possible to employ an electrical field which varies continuously from zero to a value giving full orientation of the liquid crystal molecules. In this case, a whole series of colors is generated. With a suitable thickness of the grating (typically 2 μm), a whole circle on CIE of FIG. 2 may be described. Alternatively, two or more cells may be used in a series with the grating lines crossed at a certain angle and operate individually from different electrical signals. Further, if the index of refraction of the liquid crystal with a first-magnitude electric field is $n_1$, and with a second-magnitude electric is $n_2$ and the physical amplitude is selected to be equal to 260 nm divided by the difference between $n_2$ and $n_1$, the colors respectively obtained with the first-magnitude and with the second magnitude electric field will be roughly complimentary (as indicated by the spiral curve 200 of FIG. 2).

The principles of the present invention, that provide a tunable diffractive color filter, can be implemented by other approaches than the use of a liquid crystal. The simplest method is to merely change the value of the refractive index by exchanging the liquid in the cell. Such a device can be used as a monitor for indicating the refractive index of a fluid by observing the transmitted color. One can also change the liquid employed to ones of different values of $n_0$, by using pumps, to provide a display in different colors as would be useful, for example, for advertising or other purposes. Another approach is to provide a large change of refractive index by evaporating a liquid. Various techniques to realize this idea are possible. A simple one would be to heat the grating by a current pulse through a transparent electrode underneath it. The liquid in the cell can then be changed to a gas with a significantly different refractive index. A thin layer of gas formed above and within the grating lines will collapse when the current is switched off and thereby reform the liquid. Other means for heating could include radiation energy, ultrasonic energy, etc. A still other approach would be to employ electro-chemical reactions which lead to a change in refractive index in the fluid (liquid or gas) in the cell. For instance, the state of charge of a voltaic cell manifests itself in the value of the refractive index of the cell solution. Such a cell, incorporating a refraction grating in contact with the solution would form a nonvolatile display. Further, a number of electro-optical effects exist, other than that manifested by a liquid crystal, in which the refractive index of a fluid changes or becomes anisotropic under the action of an electric field which is applied on two electrodes located on opposite sides of the grating structure containing the fluid. One such effect is that manifested by certain liquid ionic solutions, which in response to an electric field, applied capacitively through an insulating layer to prevent electrolysis, produces a depletion layer on both electrodes which can be thick enough to cause a substantial change in the observed index of refraction $n_0$.

From the foregoing discussion it is clear that there are many physical effects which vary the index of refraction of a fluid and which may be employed to provide a tunable diffractive subtractive filter, in accordance with the principles of the present invention.

In the claims which follow, the expression; "control means for selectively controlling the index of refraction of said fluid medium" is intended to be generic to both electrically controlling the index of refraction of one (or more) materials making up the medium or physically controlling the index of refraction of the one (or more) materials making up the medium as, for example, by replacing one material with another.

What is claimed is:

1. A tunable diffractive subtractive color filter comprising a solid diffractive phase medium including a fixed, predetermined waveform profile surface relief pattern, an adjustable index-of-refraction, optically-transparent, fluid medium in which said surface relief pattern is immersed, and control means for selectively controlling the index of refraction of said fluid medium;
   wherein said selectively controllable index of refraction of said fluid medium is within a continuous range of indices of refraction that extend from a certain maximum index of refraction to a certain minimum index of refraction, and said medium is a transmissive medium having a given index of refraction which is equal to or greater than said certain maximum or is equal to or less than said certain minimum,
   wherein said predetermined waveform profile is a rectangular waveform profile having a given physical amplitude and a given aspect ratio, and
   wherein said given physical amplitude is substantially equal to 260 nanometers divided by the difference between said certain maximum and said certain minimum indices of refraction.

2. A tunable diffractive subtractive color filter comprising a solid diffractive phase medium including a fixed, predetermined waveform profile surface relief pattern, an adjustable index-of-refraction, optically-transparent, fluid medium in which said surface relief pattern is immersed, and control means for selectively controlling the index of refraction of said fluid medium;
   wherein said selectively controllable index of refraction of said fluid medium is within a continuous range of indices of refraction that extend from a certain maximum index of refraction to a certain minimum index of refraction, and said medium is a transmissive medium having a given index of refraction which is equal to or greater than said certain maximum or is equal to or less than said certain minimum,
   wherein said predetermined waveform profile is a rectangular waveform profile having a given physical amplitude and a given aspect ratio,
   wherein said fluid comprises a liquid crystal material which exhibits an index of refraction that is a function of an applied electric field and wherein said control means includes means for controllably applying an electric field to said fluid in the vicinity of said pattern,
   wherein said means for controllably applying said electric field comprises means for applying a binary field having a first state and a second state, and wherein said liquid crystal has said certain maximum index of refraction when said electric field has said first state and has said certain minimum index of refraction when said electric field has said second state, wherein said given index-of-refraction is substantially equal to a particular one of said certain maximum and minimum indices of refraction, and wherein the product of said given physical amplitude and the absolute value of the difference between said given index-of-refraction and the other one of said certain maximum and minimum indices of refraction is substantially equal to 280 nanometers.

* * * * *

UNITED STATES PATENT AND TRADEMARK OFFICE
CERTIFICATE OF CORRECTION

PATENT NO. : 4,251,137

DATED : February 17, 1981

INVENTOR(S) : Karl Knop, et al

It is certified that error appears in the above-identified patent and that said Letters Patent is hereby corrected as shown below:

Column 2, line 7, "a" should be ---a---;

Column 2, line 9, "a" should be ---a---;

Column 2, line 28, "nd" should be ---nd---;

Column 3, line 7, "a" should be ---a---;

Column 3, line 30, after "change" insert ---in the grating---;

Column 3, line 41, after "is" insert ---to---;

Column 3, line 44, "a" should be ---a---;

Column 3, line 46, "a" should be ---a---;

Column 3, line 64, delete second "structure";

Column 4, line 39, "closed" should be ---close---;

Column 4, line 44, "a" should be ---a---;

Signed and Sealed this

Twelfth Day of May 1981

[SEAL]

Attest:

RENE D. TEGTMEYER

Attesting Officer     Acting Commissioner of Patents and Trademarks